(12) United States Patent
Parkman, III et al.

(10) Patent No.: US 7,945,139 B2
(45) Date of Patent: May 17, 2011

(54) DUST CAP FOR FIBER OPTIC ADAPTER

(75) Inventors: Louis Edward Parkman, III, Richland Hills, TX (US); Ronald Lee Mudd, Coppell, TX (US); Michael De Jong, Colleyville, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/811,996

(22) Filed: Jun. 13, 2007

(65) Prior Publication Data

US 2008/0310795 A1      Dec. 18, 2008

(51) Int. Cl.
G02B 6/36          (2006.01)

(52) U.S. Cl. .......................................................... 385/139

(58) Field of Classification Search .................. 385/134, 385/139

See application file for complete search history.

(56) References Cited

U.S. PATENT DOCUMENTS

| | | | | |
|---|---|---|---|---|
| 5,202,949 A * | 4/1993 | Hileman et al. | ............... | 385/134 |
| 5,414,790 A * | 5/1995 | Lee et al. | ...................... | 385/139 |
| 5,541,012 A * | 7/1996 | Ohwaki et al. | ................. | 428/690 |
| 6,004,043 A | 12/1999 | Abendschein et al. | ......... | 385/76 |
| 6,079,881 A | 6/2000 | Roth | ................................ | 385/76 |
| 6,081,647 A | 6/2000 | Roth et al. | ..................... | 385/139 |
| 6,108,482 A | 8/2000 | Roth | .............................. | 385/139 |
| 6,188,825 B1 * | 2/2001 | Bandy et al. | .................. | 385/134 |
| 6,227,717 B1 | 5/2001 | Ott et al. | ......................... | 385/53 |
| 6,343,814 B1 * | 2/2002 | Bucher et al. | ................. | 285/319 |
| 6,398,422 B1 * | 6/2002 | Szilagyi et al. | ................. | 385/76 |
| 6,425,694 B1 | 7/2002 | Szilagyi et al. | ................. | 385/76 |
| 6,547,450 B2 * | 4/2003 | Lampert | ......................... | 385/78 |
| 6,554,485 B1 | 4/2003 | Beatty et al. | .................... | 385/72 |
| 6,634,798 B2 * | 10/2003 | Cheng | ............................. | 385/76 |
| 6,712,524 B2 | 3/2004 | Beatty et al. | .................... | 385/72 |
| 6,718,133 B2 * | 4/2004 | Nakata et al. | ................... | 396/96 |
| 7,349,619 B2 * | 3/2008 | Beck et al. | ..................... | 385/139 |
| 7,572,066 B2 * | 8/2009 | de Jong et al. | ................. | 385/88 |
| 2001/0028771 A1 * | 10/2001 | Johansson | ....................... | 385/92 |
| 2003/0002810 A1 * | 1/2003 | Cheng | ............................. | 385/76 |
| 2005/0220434 A1 * | 10/2005 | Hsieh | ............................. | 385/134 |
| 2007/0177843 A1 * | 8/2007 | Beck | ................................ | 385/59 |
| 2007/0217749 A1 * | 9/2007 | Jong et al. | ....................... | 385/88 |

* cited by examiner

*Primary Examiner* — Charlie Peng
*Assistant Examiner* — Eric Wong

(57) ABSTRACT

An adapter dust cap comprising a dust cap body defining a clearance extending at least partially therethrough, a resilient member attached to the connector body, and a latching feature attached to the resilient member and configured to engage within internal geometry defined by a connector adapter. The adapter dust cap is translucent so that visible light from a connector may diffuse therethrough, and may include a material or coating thereon for converting light in the invisible spectrum to visible light so that the light can be detected through the dust cap without removing the dust cap from an adapter to which it is engaged.

18 Claims, 5 Drawing Sheets

DUST CAP FOR FIBER OPTIC ADAPTER

BACKGROUND OF THE INVENTION

1. Field of the Invention

The present invention relates generally to dust caps that engage with fiber optic connector adapters and, more particularly, to dust caps that have a structure operable for securely engaging the internal geometry of a fiber optic connector adapter, and optionally including material that reacts with invisible light emanating from a connector engaged with the back side of the adapter to produce a visual signal.

2. Technical Background

Fiber optic applications using optical connectors and adapters frequently include requirements for the identification of specific optical fibers during installation, interconnection and maintenance testing. Examples of such applications include multi-dwelling units, cabinets, local area networks and industrial networks, among others. Within these systems, connections between optical fibers are typically accomplished through the use of adapters mounted within patch panels, cabinets or racks. A patch panel typically includes a large number of optical connectors pre-installed into the backside of a number of connector adapters, thus providing partially populated adapters. The front side of the adapters are typically covered until needed using some form of covering to prevent dust and other contamination from entering the adapter and contacting the polished end face of the back side connector.

When a specific connector of a panel is needed for interconnection with another connector, visible light, commonly a red laser diode source from a Visual Fault Locator (VFL), is used to perform optical fiber tracing for connector identification. Visible light introduced through the back side connector is typically visible through the front side of an unpopulated adapter, and in the case of an adapter covered with a dust cap, the dust cap is typically translucent such that the visible light is detectable through the dust cap. In the case of invisible light being transmitted through the back side connector, the visible light requires detection through the use of costly detection equipment only after the dust cap has been removed from the adapter. When removing a dust cap to detect the invisible light, the opportunity exists for eye damage if the light is accidentally viewed. Further, removing the back side connector from its adapter or removing the dust cap from the front side of the adapter also introduces an opportunity for dust and other contamination to reach the polished end face of the back side connector that may damage or degrade a signal.

As stated above, dust caps are typically made from opaque plastic materials, such as low-density polyethylene materials. Dust caps have also been designed to engage adapters by interference fit, and have not included structure to engage with the adapter in the manner that a connector does, thus conventional dust caps have failed to provide proper long-term engagement, and as a result, commonly disengage from their adapter and fall to the floor. One example of a conventional, translucent dust cap that mounts by interference fit is shown in FIG. 1. Generally, the dust cap 10 includes a cylindrical sleeve 12 having an open first end 14 and an opposed second end 16 that is closed by a translucent end member 20. The sleeve 12 further defines a partially lengthwise extending bore 18 for receiving a ferrule therein. The translucent end member 20 may be provided with a lens 22 to facilitate optical communication. Further, the lens may be provided with an opaque portion to block light transmitted directly along the optical axis to prevent eye damage. A medial portion of the sleeve 12 defines an internal chamfer 24 to interfere with ferrule structure. As visible light from a ferrule emanates through the lens 22 it is detectable.

While conventional dust caps are suitable for detecting visible light through the dust cap, by design they are not capable of detecting invisible light through themselves, and are not properly designed to remain engaged for long periods of time without becoming dislodged. Disadvantageously, a long term interference fit requires tight molding tolerances of both the dust caps and the adapters. Further, conventional dust caps are subject to thermal expansion and other external forces such as vibration which may cause the dust cap to dislodge from the adapter.

Accordingly, what is desired is an adapter dust cap that not only protects against dust contamination, but also engages the internal structural geometry of the adapter to ensure a secure fit that is resistant to vibration and other forces such as thermal expansion. Additionally, it would be desirable for the adapter dust cap to provide a visual indication of either visible or invisible light transmitted through a back side populated adapter for connector identification. It would further be desirable for the dust cap to diffuse visible and/or invisible light of sufficient power to cause eye damage if viewed along the optical axis.

SUMMARY OF THE INVENTION

To achieve the foregoing and other objects, and in accordance with the purposes of the invention as embodied and broadly described herein, the present invention provides various embodiments of an adapter dust cap operable for securely engaging the internal geometry of an adapter and for preventing dust contamination. The present invention further provides various embodiments of a translucent adapter dust cap that provides a visual indication of either visible or invisible light emanating from a connector engaged with the back side of the adapter.

In one embodiment, the present invention provides a translucent adapter dust cap that allows for the identification of visible light through the dust cap. The dust cap further includes material that reacts to invisible light so that the invisible light is detectable through the dust cap without having to remove the dust cap from the adapter. The adapter preferably defines engagement structure that compliments internal engagement structure of the adapter, providing secure, long-term engagement without dislodging. In one method of use, multiple dust caps are used to populate connector adapters that are mounted within a patch panel, cabinet or rack and populated from the back side with connectors. Thus, an adapter is pre-loaded from the back side with a connector and pre-loaded from the front side with a dust cap. The dust cap remains until a back side connector is properly identified and then removed to make way for a front side connector. The dust cap may define structure similar to engagement structure of a connector, thus providing ideal engagement between the dust cap and the adapter. The dust cap is preferably made from a translucent plastic material and may alter the wavelength of invisible light transmitted therethrough. Alternatively, a material may be chosen that absorbs damaging wavelengths of light.

In another embodiment, spring and keying structure is provided by the dust cap such that the inner structural geometry of the adapter may be securely engaged, thereby preventing the dust cap from becoming dislodged by vibration or thermal forces. Further, the spring allows the dust cap to be easily installed and removed as it deflects sufficiently to allow the keying feature to engage/disengage from the inner geometry of the adapter. In other exemplary embodiments, a dust cap for a duplex adapter is provided, wherein the dust cap is provided with a dual configuration and dual corresponding spring and keying feature for engaging/disengaging the inner structural geometry of the adapter. Both spring and keying features may be simultaneously activated.

Additional features and advantages of the invention are set forth in the detailed description which follows and will be readily apparent to those skilled in the art from that description, or will be readily recognized by practicing the invention as described in the detailed description, the drawings and the appended claims.

It is to be understood that both the foregoing general description and the following detailed description present exemplary embodiments of the invention as well as certain preferred embodiments. As such, the detailed description is intended to provide an overview or framework for understanding the nature and character of the invention as recited in the appended claims. The accompanying drawings are included to provide a further understanding of the invention, and are incorporated into and constitute a part of this specification. The drawings illustrate various preferred embodiments of the invention, and together with the detailed description, serve to explain the principles and operations thereof. Additionally, the drawings and descriptions are meant to be merely illustrative, and are not intended to limit the scope of the claims in any manner.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE EXEMPLARY EMBODIMENTS

The present invention will now be described more fully hereinafter with reference to the accompanying drawings in which exemplary embodiments of the invention are shown. However, this invention may be embodied in many different forms and should not be construed as limited to the embodiments set forth herein. These exemplary embodiments are provided so that this disclosure will be both thorough and complete, and will fully convey the scope of the invention to those skilled in the art. Like reference numbers refer to like elements throughout the various drawings. Specific embodiments of translucent adapter dust caps operable for securely engaging the inner structural geometry of a fiber optic connector adapter and for producing a visual signal notification of visible or invisible light emanating from a connector inserted into the adapter are shown throughout the figures. It should be understood, however, that alternative adapter dust cap designs may vary in order to accommodate various fiber optic connector adapters, including, but not limited to, single fiber and multi-fiber adapters capable of accommodating SC, LC, MTP and MU connectors, among others. Alternative adapter dust cap designs may also vary while still proving protection against dust contamination and blocking light transmitted along the optical axis.

Adapter dust caps provided herein are self-aligning and easily installable and removable from the inner structural geometry of a connector adapter. Advantageously, the dust caps of the exemplary embodiments described herein not only prevent contamination of fiber optic connectors, but also ensure proper mounting and stability within the connector adapter. The adapters shown herein define opposing openings for interconnecting optical connectors, one from the back side of the adapter and one from the front side. As known by those skilled in the art, one connector is received in a cavity of the adapter base (a first open end) and the other connector is received in a cavity of the adapter cap (a second open end). Advantageously, the design and construction of the exemplary embodiments of the dust cap are such that they may engage with either end of an adapter. Further, once inserted into the adapter, both lateral and vertical movement is minimized.

Figure 1:
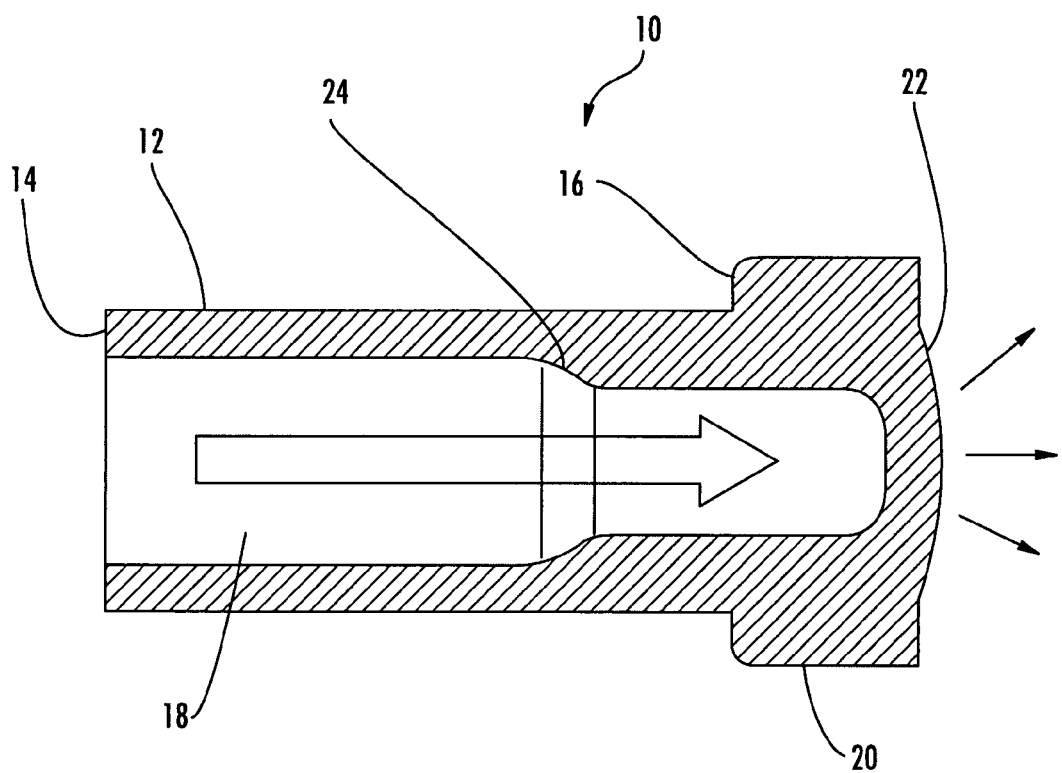
FIG. 1 is a cross-sectional view of a conventional dust cap for mounting upon a fiber optic ferrule.
Figure 2:
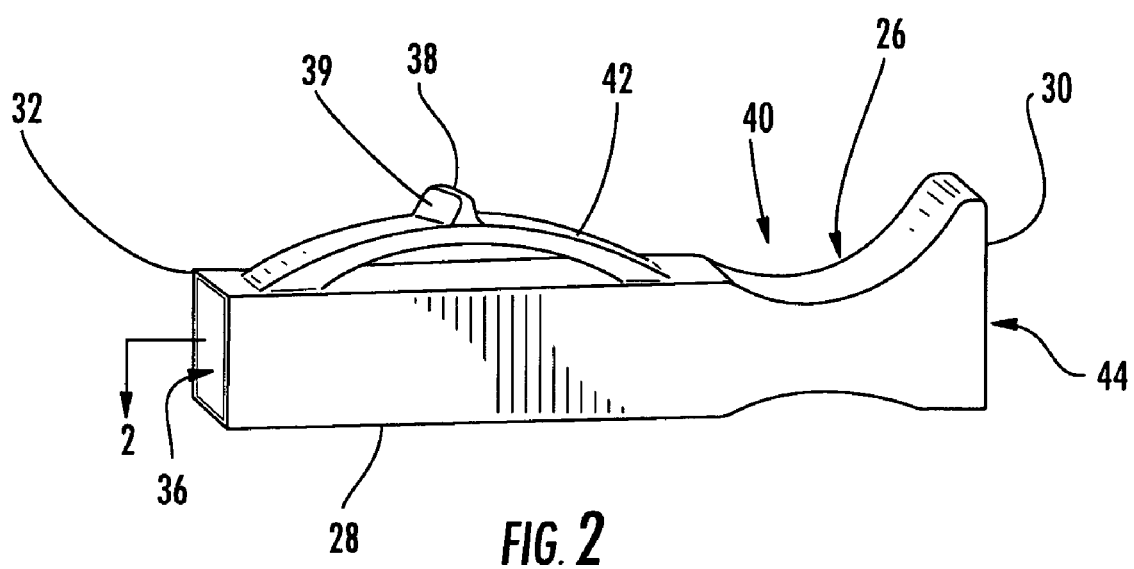
FIG. 2 is a perspective view of an adapter dust cap constructed in accordance with an exemplary embodiment of the present invention.
Figure 3:
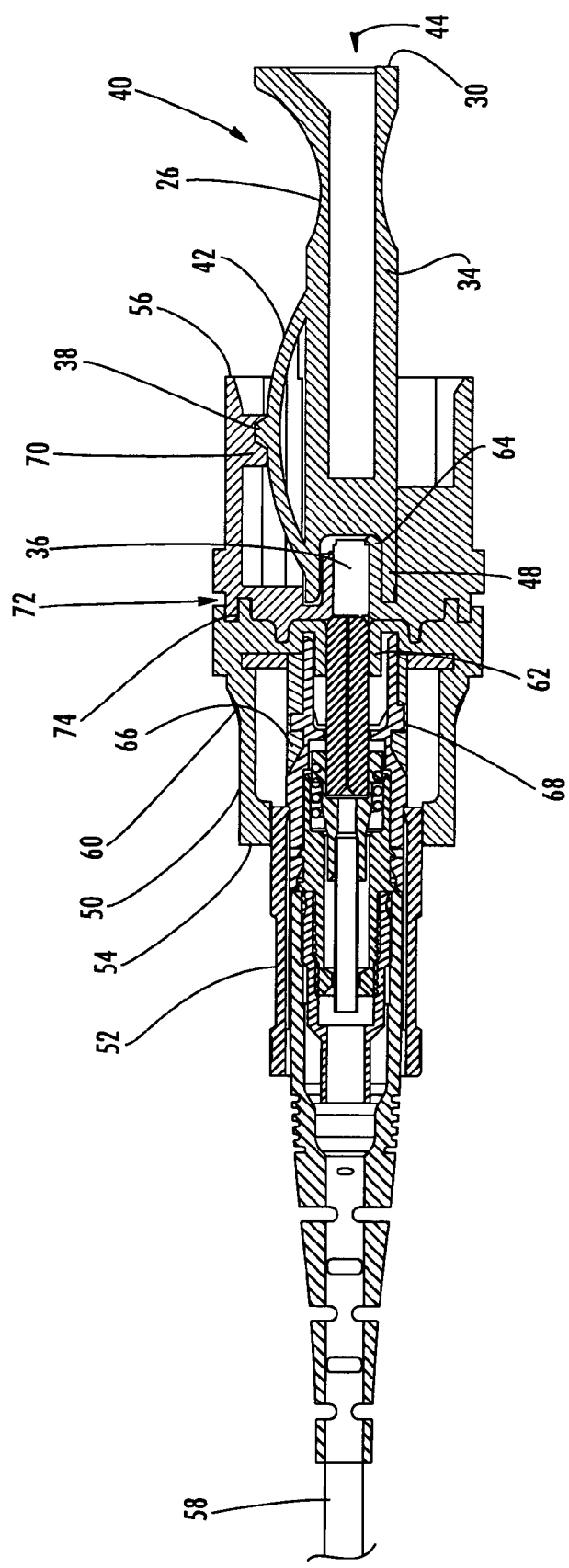
FIG. 3 is a cross-sectional view of the dust cap of FIG. 1 loaded into a front side of an adapter having a connector loaded into a back side, and taken along line 2-2.

Referring to FIGS. 2-3, a perspective view of an exemplary dust cap 26 constructed in accordance with the present invention is shown. As described in more detail below, the dust cap 26 is designed to be mounted into an unoccupied end of a connector adapter 50 to protect the front face of a ferrule mounted into the other end of the adapter from contaminants and other debris. The dust cap 26 generally includes a body 28 that extends lengthwise between opposed first and second ends 30, 32. While the body 28 is depicted as having a generally rectangular outer surface, the body can be of any suitable shape as long as it engages the adapter and does not interfere with the mounting of the dust cap into the adapter. The body 28 may define a lengthwise extending bore 34 or "clearance" that extends from an opening 36 through the second end 32 for permitting either visible or invisible light to enter and be viewed through an opening 44 or lens at the first end 30. In an alternative embodiment, the dust cap may be solid. The dust cap 26 defines the opening 44 at the viewing end 30 so that visible or invisible light emanating from a back side connector and passing through the opening 36 may be detected by an operator. Further, the shape of the dust cap 26 ensures that it cannot be misaligned within the adapter 50. The shape likewise advantageously prevents rotational or vertical movement once engaged with the adapter.

Along a medial portion of the body 28, the dust cap 26 is provided with a resilient member 42 defining a latching feature 38 operable for engaging the inner structural geometry of the adapter 50 and properly holding the dust cap 26 in place. In one embodiment, the resilient member and latching feature are similar in structure and function similarly to a trigger mechanism of a connector. In another embodiment, the resilient member is spring-like and the latching feature is received within internal adapter geometry, and defines chamfered surfaces for allowing insertion/removal by simply pushing/pulling without having to activate a trigger. In the embodiment shown in FIGS. 2-3, a portion of the resilient member and all of the latching feature are disposed within the adapter when inserted. As previously described, the use of the resilient member 42 and latching feature 38 not only holds the dust cap 26 in place, but advantageously provides resistance to vibration, thermal expansion and other forces that cause conventional dust caps to dislodge. Further, while the illustrated embodiment shows the resilient member 42 and latching feature 38 as being integrally formed with the dust cap 26, it will be appreciated that the resilient member 42 and latching feature 38 may be distinct components which are joined to the dust cap 26. The latching feature 38 is provided with chamfers 39 on each side thereof such that when mounting or inserting the dust cap 26 into an adapter 50 one need only push or pull the dust cap 26. The chamfers 39 latch into the inner structural geometry of the adapter 50 and the resilient member 42 allows the latching feature 38 to deflect sufficiently to engage/disengage from the inner structural geometry. Advantageously, the provision of the resilient member 42 and latching feature 38 also eliminates the need of precise molding and construction as was required by conventional dust caps requiring a tight interference fit.

To facilitate placement and removal of the dust cap 26 within the adapter 50, a grip 40 is included about the first end 30 of the dust cap 26 for push-pull type action. In the illustrated embodiment, the grip 40 has a generally convex cross-section, however, it will be appreciated by those skilled in the art that any suitable shape may be used which is conducive to gripping, pushing and pulling the dust cap 26.

Referring specifically to FIG. 3, a connector adapter 50 is shown populated with a connector 52 and a translucent adapter dust cap 26. An optical fiber cable 58 is shown terminated with a connector 52 and loaded into an adapter 50 for exemplary purposes only, and designs may vary to accommodate other common connectors. In an exemplary application, the adapter 50 may be disposed within a patch panel such that the connector 52 is pre-installed into the back side of the adapter 50 ready for interconnection with a front side installed connector, such as a connector of a fiber optic jumper. The translucent adapter dust cap 26 is preferably loaded and fits within the adapter 50 in a manner similar to a connector loaded into the front side of the adapter, thus providing a seal and engagement substantially similar to that provided between the adapter 50 and a mating connector. Adapters may be held into the patch panel using a latch mechanism 60 or other method known in the art. A slot (not shown) defined by the adapter 50 fits a key (not shown) of the connector 52 to insure alignment with the adapter 50 and proper connector orientation. In exemplary embodiments, the dust cap 26 may likewise define a key for insertion within the slot, however, as shown, proper dust cap orientation and a n alignment key is not required. Alignment is provided by the shape and the latching mechanism is positioned similar to that of a trigger of a connector, thus providing keyed engagement.

The dust cap 26 defines a ferrule opening 36 about one end for clearing a boss on the inside of the adapter, or the mating geometry 64 of the adapter 50 and is of sufficient length such that the polished end face of the ferrule 62 does not contact a surface of the dust cap 26. In an SC embodiment, for example, the interior of the adapter 50 defines a pair of flexible latch arms 66 that snap over flats 68 defined by the connector housing. To release the back side connector 52 from the adapter 50, the latch arms 66 are flexed outward to release. This mechanism may not apply to LC embodiments. The interior of the adapter 50 defines an internal structural geometry 70 that provides an interference fit with the dust cap 26. The dust cap 26 is held in place when the inner structural geometry 70 engages the latching feature 38 of the dust cap 26. Reference number 72 illustrates a slot formed between features 74 of the adapter for securing a mounting wall therebetween.

The dust cap 26 is preferably comprised of an optically clear or semi-translucent material capable of viewing light emanating therethrough. The material should be sufficiently translucent to provide a visual indication of light, such as glowing. The material may diffuse light away from the optical axis to avoid damage to an operator's eye. The internal structural geometry of the dust cap 26 may include angled or curved surfaces, facets or lenses to reflect the light away from the optical axis and diffuse it radially outwardly. The internal structural geometry of the dust cap 26 may also function to reflect or diffuse a light source of sufficient power, such as that from a visual fault locator (VFL). A visual indication of light is provided and diffused light is capable of being detected through the translucent dust cap 26 so that it is not necessary to remove the dust cap to detect the light, and it is also not necessary to remove the back side connector 52 from the adapter 50 to detect the light.

The ferrule opening 36, as shown, is sized to interact with the internal structural geometry of the LC adapter for exemplary purposes only and may be sized differently to accommodate other single and multi-fiber ferrules. The viewing end 30 includes the opening 44 that serves to reduce the amount of material needed for the dust cap 26. Features 48 of the dust cap engage the adapter 50.

Figure 4:
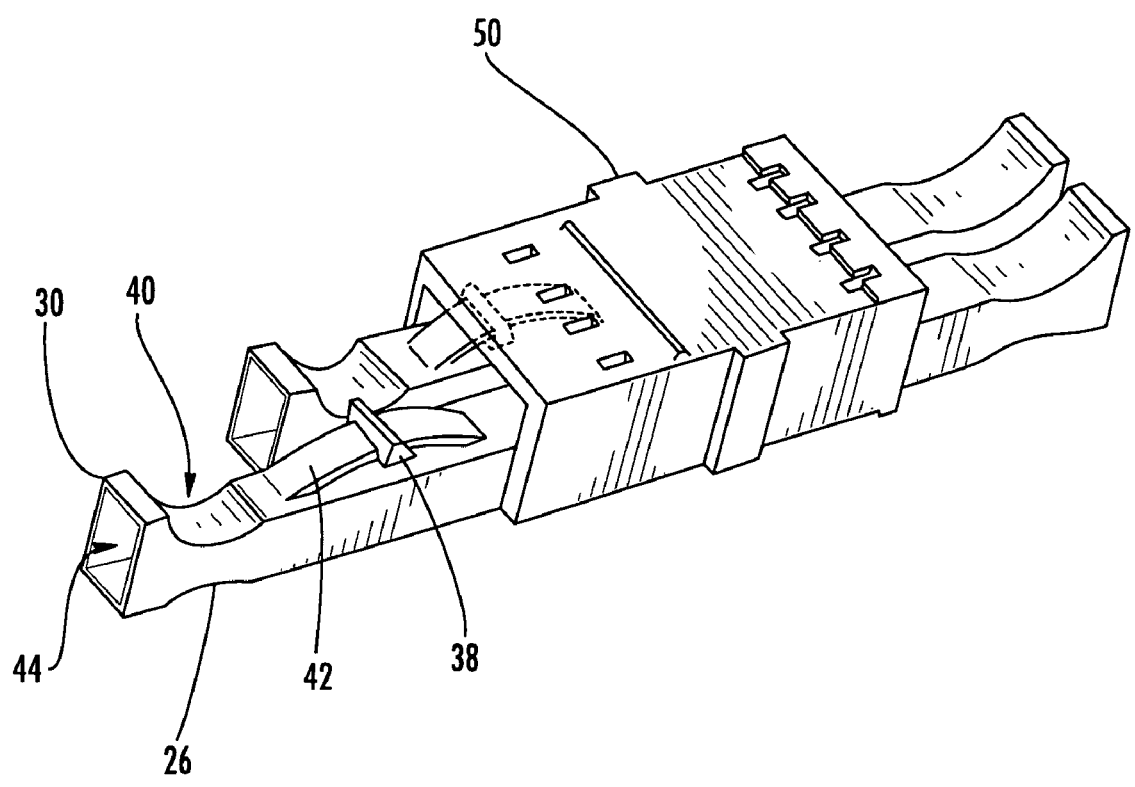
FIG. 4 is a perspective view of a duplex adapter having a plurality of adapter dust caps loaded therein.

Referring to FIG. 4, an exemplary duplex adapter 50 is shown capable of receiving multiple dust caps and connectors. A connector is loaded by removing a dust cap 26 by pulling on the grip 40 of the dust cap 26 thereby compressing the resilient member 42 and releasing the latching feature 38, and then loading the connector.

Figure 5:
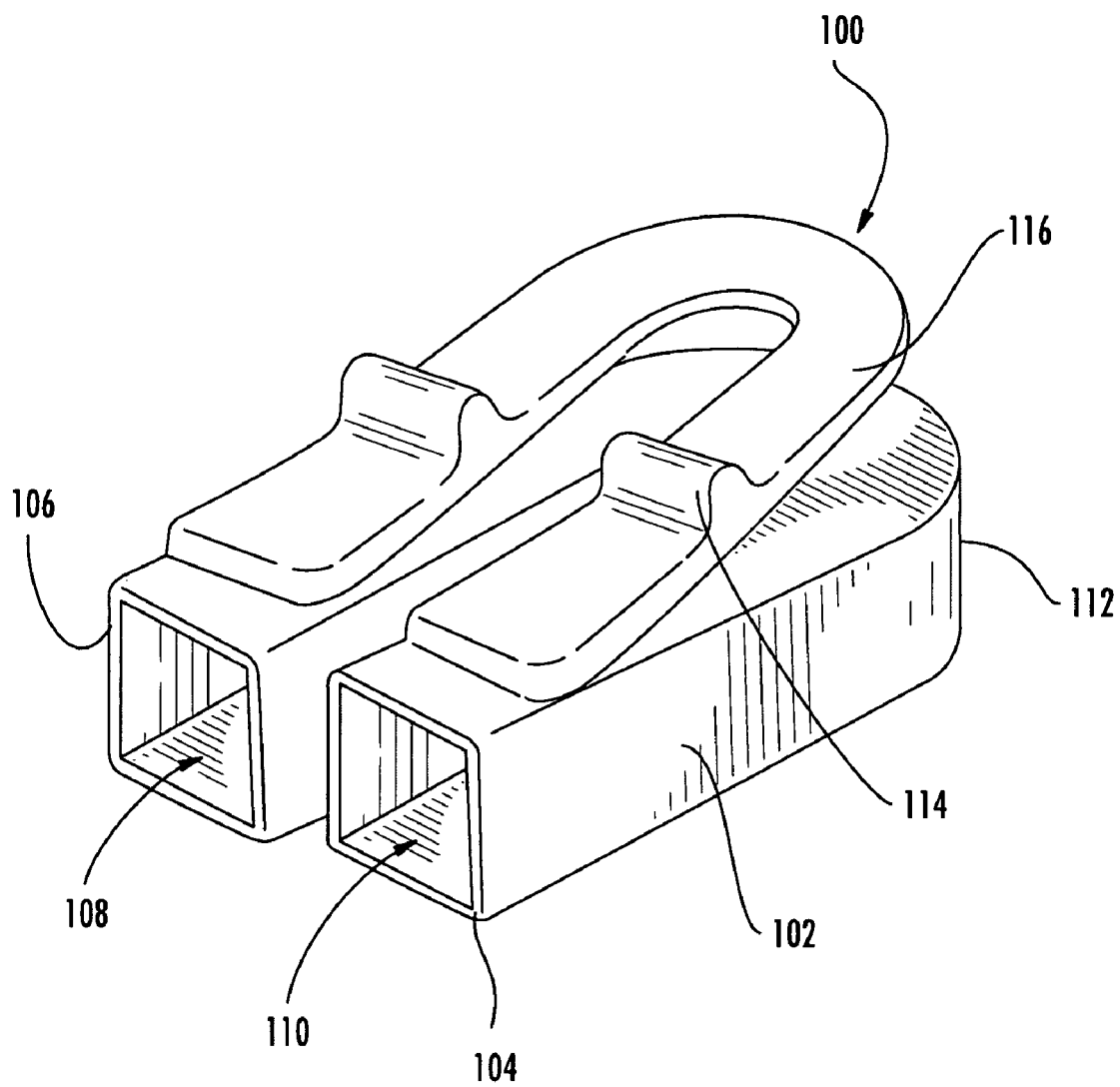
FIG. 5 is a perspective view of a duplex translucent adapter dust cap with simultaneous engagement/disengagement constructed in accordance with another exemplary embodiment of the present invention.

Referring to FIG. 5, an exemplary embodiment of a duplex dust cap 100 operable for engagement with a duplex adapter is shown. The dust cap 100 includes a sleeve 102 that extends between opposed first and second ends 104, 106. The sleeve 102 further includes a generally U-shaped medial portion 112. The dust cap 100 is designed to engage a duplex connector adapter in order to protect the front face of more than one ferrule mounted into the other end of the adapter. While the sleeve 102 is depicted as having a generally rectangular outer surface, the sleeve 102 can be of any suitable shape as long as the sleeve 102 engages the adapter and does not interfere with the mounting of the dust cap 100 into the adapter. Similar to the body 28 of the above described dust cap, the sleeve 102 defines a bore (not shown) that extends between two opposed openings 108, 110 located at each opposed end 104, 106 for permitting either visible or invisible light to enter. The cross-section and design of the dust cap 100 ensures that the dust cap 100 cannot be misaligned within the duplex adapter. Further, the cross-section and design of the dust cap 100 likewise advantageously prevents rotational or vertical movement of the dust cap 100 once mounted within the duplex adapter, thereby protecting the unconnected optical fibers of the connector.

In exemplary embodiments, a single trigger 116 having at least one keying feature 114 located thereon is provided about the sleeve 102. The trigger is flexible and the keying feature 114 corresponds in size and shape to internal geometry of an adapter. While the illustrated embodiment shows the trigger 116 and keying feature 114 as being integrally formed with the dust cap 100, it will be appreciated that they may be distinct components joined to the dust cap 100. Both keying features 114 may be simultaneously activated by the single trigger 116.

Examples of materials used to convert transmission light to visible light may consist of inorganic materials comprising elements of erbium (Er) and halogens or compounds thereof, among other infrared-to-visible wavelength upconversion materials. Preferred materials may include coatings or additives added to the dust cap for molding and have sensitivity for infrared light. Halogens may include chlorine, bromine and iodine and may include elements of yttrium, lead, potassium, barium, sodium, silver and cesium exclusive of the oxides thereof. The emission property of rare earth ions in a solid are dependent on the concentration of the rare earth ions themselves and on the matrix surrounding the rare earth ions. The matrix may or may not contain oxygen. Other materials capable of converting infrared to visible light are envisioned without departing from the scope of the invention, for example, films used to produce IR detection cards, films, and wands available from several companies including, Edmunds Optics, Newport, Sumita, Entek, Kodak, NewFocus, Applied Scintillation Technologies and Lumitek. Light sources for connector identification include those capable of emitting visible and invisible light. Dust cap material may be tailored to attenuate certain wavelengths and enhance the visibility of others. The dust caps are also preferably molded using a material that is relatively hard and does not shrink significantly following the molding process, such that the resulting dimensions of the dust cap may be precisely and consistently defined.

In alternative embodiments, the color of the translucent adapter dust cap may also be chosen to maximize the visibility of light of certain wavelengths. Colors may be matched to wavelength and include clear, yellow, rose, white, etc. The dust cap may further include a diffusion web that fits tightly over the mating features of the fiber optic adapter to block dust and dirt from reaching/collecting on the end face of the connector ferrule. The web preferably diffuses the light energy so that the dust cap body illuminates. Although a latching mechanism applied to a dust cap is provided, it is envisioned that this latching mechanism may be applied to connectors and other optical components as well. In one example, the latching mechanism may be used in place of a conventional trigger of a connector.

It will be apparent to those skilled in the art that innumerable modifications and variations can be made to the exemplary embodiments of the apparatus and methods of the invention shown and described herein without departing from the spirit and scope of the invention. Thus, it is intended that the present invention cover all conceivable modifications and variations of this invention, provided those alternative embodiments fall within the scope of the appended claims and their equivalents.

That which is claimed is:

1. An adapter dust cap, comprising:
   a dust cap body defining a clearance extending at least partially therethrough and a first end of the dust cap body having a pulling grip with a generally convex cross-section;
   a resilient member attached to the dust cap body; and
   a latching feature attached to the resilient member and facing outward configured to engage within internal geometry defined by a connector adapter, wherein the latching feature includes chamfers on each side thereof.

2. The adapter dust cap according to claim 1, wherein the dust cap body, the resilient member and the latching feature are integrally formed.

3. The adapter dust cap according to claim 1, wherein the dust cap body is translucent.

4. The adapter dust cap according to claim 1, wherein the dust cap body is translucent and includes invisible-to-visible light converting material.

5. The adapter dust cap according to claim 1, wherein the dust cap body is translucent and includes an invisible-to-visible light converting coating.

6. The adapter dust cap according to claim 1, wherein the dust cap defines a clearance for receiving an adapter boss feature.

7. The adapter dust cap according to claim 1, wherein the dust cap attenuates light.

8. The adapter dust cap according to claim 1, wherein the dust cap includes multiple bodies and multiple latching features and a resilient member or multiple resilient members connected together for simultaneously releasing the multiple latching features.

9. An adapter assembly, comprising:
   a fiber optic adapter defining one or more clearances for receiving at least one of a fiber optic connector and an adapter dust cap, the adapter defining internal geometry for receiving latching features of the fiber optic connector and the adapter dust cap; and
   wherein the adapter dust cap comprises a dust cap body defining a clearance extending at least partially therethrough, a resilient member attached to the dust cap body, and the latching feature attached to the resilient member and facing outward, wherein a first end of the dust cap body has a pulling grip with a generally convex cross-section along a longitudinal axis.

10. The adapter assembly according to claim 9, wherein the dust cap body, the resilient member and the latching feature are integrally formed.

11. The adapter assembly according to claim 9, wherein the dust cap body is translucent.

12. The adapter assembly according to claim 9, wherein the dust cap body is translucent and includes invisible-to-visible light converting material.

13. The adapter assembly according to claim 9, wherein the dust cap body is translucent and includes an invisible-to-visible light converting coating.

14. The adapter assembly according to claim 9, wherein the dust cap defines a clearance for receiving a connector ferrule.

15. The adapter assembly according to claim 9, wherein the dust cap attenuates light.

16. The adapter assembly according to claim 9, wherein the dust cap includes multiple bodies and multiple latching features and a resilient member or multiple resilient members connected together for simultaneously releasing the multiple latching features.

17. A fiber optic dust cap for an adapter comprising a translucent dust cap body including invisible-to-visible light converting material, wherein a first end of the dust cap body has a pulling grip with a generally convex cross-section along a longitudinal axis and a resilient member attached to the dust cap body with a latching feature attached to the resilient member and facing outward.

18. The dust cap according to claim 17, wherein the material is a coating.

* * * * *